United States Patent [19]

Zabler et al.

[11] 4,174,638

[45] Nov. 20, 1979

[54] PRESSURE PICKUP FOR MEASURING THE PRESSURE IN THE INTAKE MANIFOLD OF AN INTERNAL COMBUSTION ENGINE

[75] Inventors: Erich Zabler, Karlsruhe; Walter Jansche, Durmersheim; Frieder Heintz, Stutensee, all of Fed. Rep. of Germany

[73] Assignee: Robert Bosch GmbH, Stuttgart, Fed. Rep. of Germany

[21] Appl. No.: 912,641

[22] Filed: Jun. 5, 1978

[30] Foreign Application Priority Data

Jun. 7, 1977 [DE] Fed. Rep. of Germany ....... 2725543

[51] Int. Cl.² ............................................. G01L 9/10
[52] U.S. Cl. ........................................ 73/728; 73/116; 336/30
[58] Field of Search ............... 73/728, 722, 745, 115, 73/116; 336/30, 75

[56] References Cited

U.S. PATENT DOCUMENTS

| 2,331,128 | 10/1943 | MacNeil | 73/115 |
| 3,101,462 | 8/1963 | Swainson | 336/75 |
| 3,718,047 | 2/1973 | Nakagawa | 73/728 |
| 4,042,899 | 8/1977 | Tomezak | 73/728 |

Primary Examiner—Donald O. Woodiel
Attorney, Agent, or Firm—Edwin E. Greigg

[57] ABSTRACT

A pressure pickup for measuring the pressure in the intake manifold of an internal combustion engine. The pressure pickup comprises a part, movable in response to the manifold pressure, to which is coupled means for short-circuiting the magnetic flux lines of an electromagnet so that the change in flux lines is detected by the electromagnetic coil and measured by an induction evaluation circuit and thus indirectly measuring the manifold pressure.

12 Claims, 2 Drawing Figures

PRESSURE PICKUP FOR MEASURING THE PRESSURE IN THE INTAKE MANIFOLD OF AN INTERNAL COMBUSTION ENGINE

BACKGROUND OF THE INVENTION

The invention relates to a pressure pickup for measuring the pressure in the intake manifold of an internal combustion engine. Present pressure pickups comprise a housing having a diaphragm connected to the armature of a coil surrounded by a core. In case of a change in pressure, the armature shifts within the coil, resulting in a new value of inductance, and this change in inductance is converted into an electric signal by means of an electric evaluation circuit. The problem occurring in the present pressure pickups is one of constant centering of the armature which is the part responsive to the manifold pressure and which centering must be maintained even during rough operation of automotive vehicles.

OBJECT AND SUMMARY OF THE INVENTION

Accordingly, a primary object of the present invention is to provide a pressure pickup of the above described type in which centering of the part which is responsive to manifold pressure is completely uncritical.

This object is attained according to the invention by providing the pressure pickup with a part (diaphragm or piston) movable in response to the manifold pressure and which is coupled to a means for short-circuiting the magnetic flux lines of the core of an electromagnet and which is provided with at least one coil and an evaluation circuit for measuring the inductance and change in inductance of the coil. One advantage, according to the invention, is that a limited traverse play of the pressure responsive part is possible without loss of accuracy and, in an advantageous embodiment of the invention, the short-circuiting means, being of tubular configuration, can simultaneously serve as a guide for the pressure responsive movable part.

In another advantageous embodiment of the invention, the coil serving as the means for measuring the inductance is divided into several partial windings whereby any non-linearities of the inductance with respect to the linear movement of the short-circuiting means can be linearized, or, on the other hand, predetermined non-linearities can be produced.

In another exemplary embodiment, it is advantageous that the evaluation circuit forms a closed structural unit with the mechanical portion of the pressure pickup whereby disturbing influences exerted from the outside can be reduced to a minimum.

The invention will be better understood as well as further objects and advantages thereof become more apparent from the following detailed description of the preferred embodiments taken in conjunction with the drawing.

DESCRIPTION OF THE PREFERRED EMBODIMENTS

Figure 1:
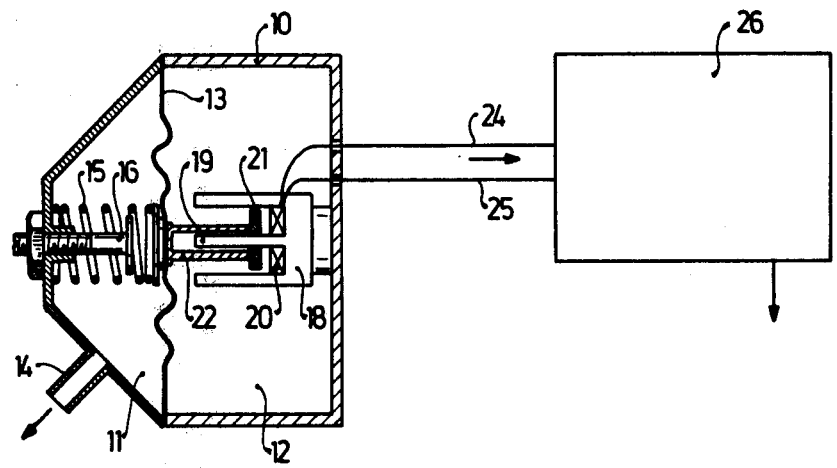
FIG. 1 shows a pressure pickup with a diaphragm as the part movable in response to the pressure.

FIG. 1 shows the pressure pickup at 10, with two chambers 11 and 12. The two chambers are separated by a diaphragm 13. The chamber 11 is in communication, via a connecting duct 14, with the intake manifold of an internal combustion engine (not shown) and contains a spring 15 as well as a stop 16 for the diaphragm 13. The spring holds the diaphragm in an initial position and an E-shaped core 18 is disposed in the chamber 12, the central leg 19 of this "E" being surrounded by a coil 20 as well as a short-circuit ring 21. This short-circuit ring 21 is connected to the diaphragm 13 by way of a sleeve 22. Two lines 24 and 25, finally, lead from the coil to an evaluation circuit 26 for evaluating or measuring the inductance of the coil.

The mode of operation of the arrangement according to FIG. 1 consists of the coil 20 on the central leg 19 producing a homogeneous magnetic alternating field, the lines of flux of which run via the central leg to the two outer legs and in the reverse direction. The short-circuit ring 21 limits the expansion of the magnetic flux and, in accordance with the laws of induction, the inductance of the coil 20 is varied in relation to the movement and position of the short-circuit ring 21.

In connection with the embodiment illustrated in FIG. 1, the following possibilities for variation exist, for example:

the diaphragm 13, shown to be corrugated in FIG. 1, and thus indicating a diaphragm of a metal or a synthetic resin, can also comprise a rubber-like material;

to obtain a specific pressure-inductance dependency relationship, the spacing between the legs of the core can be varied as a function of the displacement of the short-circuit ring 21; and furthermore, coil 20 can be subdivided into several sub-component coils so that it is possible to attain a desired relationship or dependence of the inductance on the manifold pressure.

Figure 2:
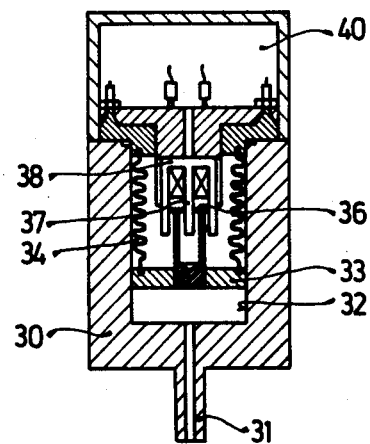
FIG. 2 shows a pressure pickup with a piston cooperating with a bellows as the part movable in response to the pressure.

FIG. 2 shows a second example of a pressure pickup 30 with a vacuum connection 31 and a piston 33 axially displaceable in a cylinder 32; this piston being held by a bellows 34. The piston 33, in turn, is connected to a short-circuit ring 36 encompassing the middle leg 37 of the E-core 38. In this embodiment, a special space 40 for the evaluation circuit is located adjacent to the pressure-sensing section of the pressure pickup.

The mode of operation of the pressure pickup as shown in FIG. 2 corresponds to that of FIG. 1. Even though both embodiments are equipped with E-cores, all kinds of modifications are possible with respect to the core and the coils once having understood the principal concept of the invention such as the use of a U-shaped core, the use of rotationally symmetrical, that is, cylindrical arrangements, and also, as mentioned above, the use of multipartite coils to obtain a specific relationship between the inductance and the pressure.

The foregoing relates to preferred embodiments of the invention, it being understood that other embodiments and variants thereof are possible within the spirit and the scope of the invention, the latter being defined by the appended claims.

What is claimed and desired to be secured by Letters Patent of the United States is:

1. A pressure pickup for measuring the pressure in the intake manifold of an internal combustion engine, comprising:

a housing with a part separating said housing into a first chamber and a second chamber, said first chamber being in communication with said intake manifold and said part being movable in response to said pressure in said first chamber, an electromagnet in said second chamber including a core and at least one coil and generating magnetic flux lines in said, means for short-circuiting the magnetic flux lines covering said central leg of said core and connected to said part for movement therewith slidably in said recess to thereby change the induction of said coil, and said core comprising an E-shaped member with three legs including a central leg defining an annular recess, said coil being disposed in the bottom of said recess in surrounding relationship with said central leg and in underlying relationship with said short-circuiting means, circuit means connected to said electromagnet for evaluating the inductance of said coil thus indirectly measuring the intake manifold pressure.

2. A pressure pickup as claimed in claim 1 including resilient means for holding said part in an initial position.

3. A pressure pickup as claimed in claim 2 wherein said resilient means comprises bellows means.

4. A pressure pickup as claimed in claim 2 wherein said resilient means comprises a spring.

5. A pressure pickup as claimed in claim 1 wherein said part movable in response to pressure in said chamber comprises a diaphragm.

6. A pressure pickup as claimed in claim 1 wherein said part movable in response to pressure in said chamber comprises a piston.

7. A pressure pickup as claimed in claim 1 wherein said coil comprises several partial windings.

8. A pressure pickup as claimed in claim 1 wherein said core is a U-shaped member and wherein said short-circuiting means engages at least one leg of said member.

9. A pressure pickup as claimed in claim 1 wherein said core is cylindrical in cross-section.

10. A pressure pickup as claimed in claim 1 wherein at least one leg of said member is geometrically designed to correlate said inductance and said manifold pressure.

11. A pressure pickup as claimed in claim 1 wherein the spacing between said legs of said E-shaped member is selected to correlate said inductance and said pressure.

12. A pressure pickup as claimed in claim 1 wherein said means for evaluating said inductance is enclosed in said housing and forms an integral part thereof.

* * * * *